US012647807B2

(12) United States Patent
Katabathuni et al.

(10) Patent No.: US 12,647,807 B2
(45) Date of Patent: Jun. 2, 2026

(54) WIRELESS TRAFFIC SNIFFING FOR MULTI-LINK OPERATION

(71) Applicant: Cisco Technology, Inc., San Jose, CA (US)

(72) Inventors: Sanjay Kishore Katabathuni, Pleasanton, CA (US); Brian Hart, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 290 days.

(21) Appl. No.: 18/594,604

(22) Filed: Mar. 4, 2024

(65) Prior Publication Data

US 2025/0280310 A1      Sep. 4, 2025

(51) Int. Cl.
*H04W 24/08* (2009.01)
*H04W 88/10* (2009.01)

(52) U.S. Cl.
CPC ............ *H04W 24/08* (2013.01); *H04W 88/10* (2013.01)

(58) Field of Classification Search
CPC ...... H04W 24/08; H04W 88/10; H04W 84/12
See application file for complete search history.

(56) References Cited

U.S. PATENT DOCUMENTS

| | | | |
|---|---|---|---|
| 2021/0274500 A1* | 9/2021 | Cariou | H04W 48/08 |
| 2021/0274574 A1* | 9/2021 | Ghosh | H04W 48/12 |
| 2022/0124857 A1* | 4/2022 | Patil | H04W 76/14 |
| 2022/0287122 A1 | 9/2022 | Wang et al. | |
| 2023/0085657 A1 | 3/2023 | Kneckt et al. | |
| 2023/0128996 A1 | 4/2023 | Cariou et al. | |
| 2023/0354298 A1 | 11/2023 | Hazarika et al. | |

OTHER PUBLICATIONS

Cisco Systems Inc: "Cisco DNA Center Intelligent Capture", Deployment Guide, Cisco public, Jul. 7, 2022, 67 pages.

* cited by examiner

*Primary Examiner* — Mohammad S Anwar
(74) *Attorney, Agent, or Firm* — Edell, Shapiro & Finnan, LLC

(57) ABSTRACT

A method to facilitate analysis of wireless communication frames in multi-link operation. The method includes receiving, at a wireless sniffing device, a first frame over a first link, the first link being associated with a first Media Access Control (MAC) address of the a multi-link device (MLD), receiving, at the wireless sniffing device, a second frame over a second link, the second link being associated with a second MAC address of the MLD, generating a mapping between (a) the first MAC address and the second MAC address and (b) a MLD MAC address for the MLD, and supplying the MLD MAC address to a traffic analysis tool along with a copy of at least aspects of the first frame and a copy of at least aspects of the second frame.

20 Claims, 6 Drawing Sheets

600

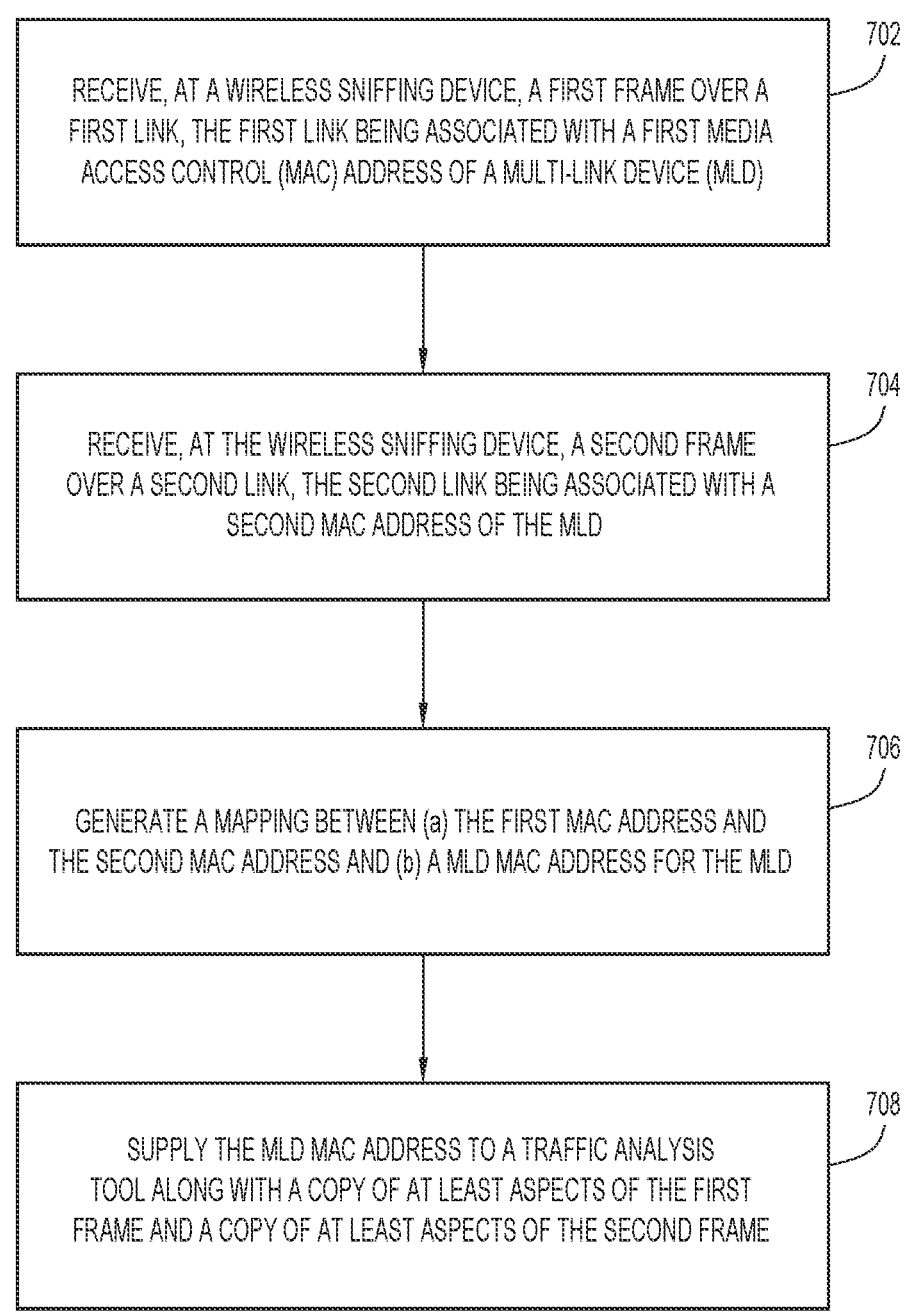

RECEIVE, AT A WIRELESS SNIFFING DEVICE, A FIRST FRAME OVER A FIRST LINK, THE FIRST LINK BEING ASSOCIATED WITH A FIRST MEDIA ACCESS CONTROL (MAC) ADDRESS OF A MULTI-LINK DEVICE (MLD)    702

RECEIVE, AT THE WIRELESS SNIFFING DEVICE, A SECOND FRAME OVER A SECOND LINK, THE SECOND LINK BEING ASSOCIATED WITH A SECOND MAC ADDRESS OF THE MLD    704

GENERATE A MAPPING BETWEEN (a) THE FIRST MAC ADDRESS AND THE SECOND MAC ADDRESS AND (b) A MLD MAC ADDRESS FOR THE MLD    706

SUPPLY THE MLD MAC ADDRESS TO A TRAFFIC ANALYSIS TOOL ALONG WITH A COPY OF AT LEAST ASPECTS OF THE FIRST FRAME AND A COPY OF AT LEAST ASPECTS OF THE SECOND FRAME    708

WIRELESS TRAFFIC SNIFFING FOR MULTI-LINK OPERATION

TECHNICAL FIELD

The present disclosure relates to systems and methodologies for facilitating network monitoring, and in particular monitoring communication traffic between wireless multi-link operation-capable devices.

BACKGROUND

Multi-link operation (MLO) is a Wi-Fi 7 (i.e., wireless local area network (WLAN)) feature that is supported by Multi-Link Devices (MLDs). Such devices allow concurrent connections in multiple channels across a single or multiple frequency bands, enabling bandwidth aggregation for greater performance. MLO also enhances reliability as efficient link switching provides more opportunities for interference mitigation. In a practical application, the MLO feature in Wi-Fi 7 means that the same client and Access Point (AP) use different Media Access Control (MAC) addresses in frames transmitted on different links, and the client's and AP's traffic can be sent on any, or all, of the links. Making sense of wireless communication frames that have been replicated and captured for analysis (or "sniffing") can thus be challenging if association occurred outside the span of the wireless capture, since that is the only IEEE 802.11-defined wireless frame that identifies which MAC addresses are being used by the same client or AP.

BRIEF DESCRIPTION OF THE DRAWINGS

FIG. 7 is a flowchart showing a series of operations that may be performed by Address Mapping/Overwriting Logic, according to an example embodiment.

DETAILED DESCRIPTION

Overview

A method to facilitate analysis of wireless communication frames in multi-link operation is provided. The method includes receiving, at a wireless sniffing device, a first frame over a first link, the first link being associated with a first Media Access Control (MAC) address of the a multi-link device (MLD), receiving, at the wireless sniffing device, a second frame over a second link, the second link being associated with a second MAC address of the MLD, generating a mapping between (a) the first MAC address and the second MAC address and (b) a MLD MAC address for the MLD, and supplying the MLD MAC address to a traffic analysis tool along with a copy of at least aspects of the first frame and a copy of at least aspects of the second frame.

In another embodiment, a device is provided. The device includes an interface configured to enable network communications, a memory, and one or more processors coupled to the interface and the memory, and configured to receive a first frame over a first link, the first link being associated with a first Media Access Control (MAC) address of a multi-link device (MLD), receive a second frame over a second link, the second link being associated with a second MAC address of the MLD, generate a mapping between (a) the first MAC address and the second MAC address and (b) a MLD MAC address for the MLD, and supply the MLD MAC address to a traffic analysis tool along with a copy of at least aspects of the first frame and a copy of at least aspects of the second frame.

EXAMPLE EMBODIMENTS

Figure 1:
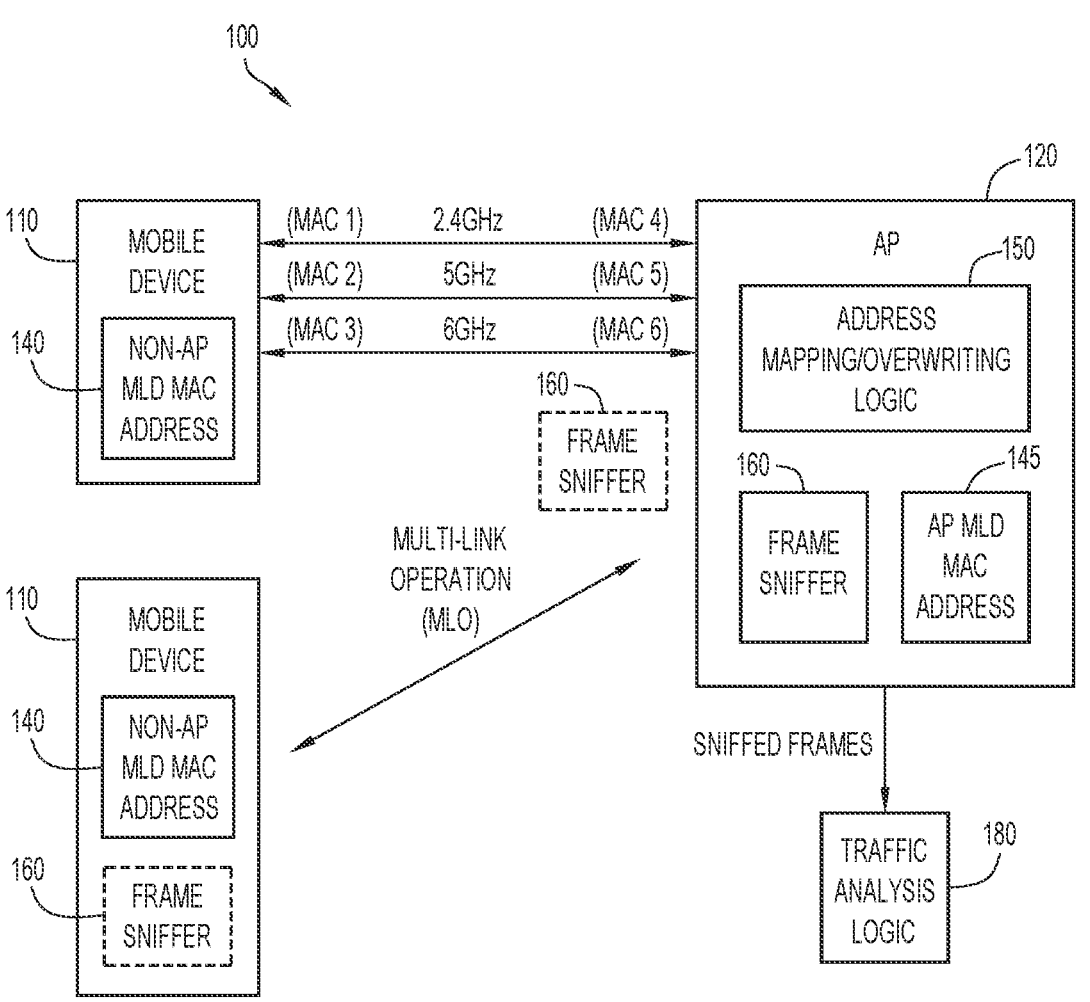
FIG. 1 shows a portion of a wireless local area network (WLAN) operating in accordance with Multi-Link Operation (MLO), including address mapping/overwriting logic that may operate in conjunction with a frame sniffer and traffic analysis logic, according to an example embodiment.

FIG. 1 shows a portion of a wireless local area network (WLAN) 100 operating in accordance with Multi-Link Operation (MLO), including Address Mapping/Overwriting Logic 150 that may operate in conjunction with a frame sniffer 160 and traffic analysis logic 180, according to an example embodiment. Specifically, a mobile device 110 is configured to communicate wirelessly with an Access Point (AP) 120 using any one or more wireless links including, e.g., a 2.4 GHz radio link, a 5 GHz radio link, and/or a 6 GHz radio link. Each of the links (or radios) supported by mobile device 110 has its own dedicated MAC address, e.g., respectively, MAC 1, MAC 2, MAC 3. Frame sniffer 160 may be incorporated into AP 120 or mobile device 110, or may be deployed separately in the vicinity of AP 120 so as to "listen" or eavesdrop on communication between AP 120 and mobile device 110.

As shown, mobile device 110 (which may also be referred to as, or considered to be, a "client," "client device" or "non-AP MLD" (versus, e.g., an AP MLD)) may be identified by a unique non-AP MLD MAC address 140, which is unique or locally unique (e.g., a randomly changing MAC address) to each mobile device 110. In one embodiment, non-AP MLD MAC address 140 is the same as one of MAC 1, MAC 2, or MAC 3. In another possible embodiment, non-AP MLD MAC address 140 is its own unique address, different from MAC 1, MAC 2, or MAC 3.

As those skilled in the art will appreciate, multiple mobile devices 110 and AP 120 may be deployed in a given WLAN 100, and as noted, each mobile device 110 would have its own unique non-AP MLD MAC address.

FIG. 1 also shows AP 120 hosting Address Mapping/Overwriting Logic 150, and a frame sniffer 160. AP 120 likewise supports the same, or at least some common, links as mobile device 110, and hosts radios that have respective MAC addresses, in this case, e.g., MAC 4, MAC 5, MAC 6. AP 120 may be identified by an AP MLD MAC address, which, like mobile device 110, could be one of MAC 4, MAC 5, or MAC 6, or could be a unique address, different from MAC 4, MAC 5, and MAC 6.

Traffic analysis logic 180 may be any network protocol analyzer, such as, e.g., Wireshark. Such an analyzer may receive and analyze sniffed or replicated packets or frames, and present the same via a user friendly interface thereby helping to troubleshoot issues that may arise in WLAN 100.

At a high level, frame sniffer 160 captures/sniffs/replicates frames/packets in response to a user request. Those frames may comprise traffic flows between mobile device 110 and AP 120, but which may have been communicated over one or more of the several links in accordance with MLO. If these frames, as is, are supplied to traffic analysis logic 180, it may be difficult to appreciate or discern which flows should be analyzed together because they may be split up by MAC addresses associated with the respective links. To address this issue, Address Mapping/Overwriting Logic 150 is provided to mask the fact that the traffic flow may have been transmitted over different links.

Figure 2:
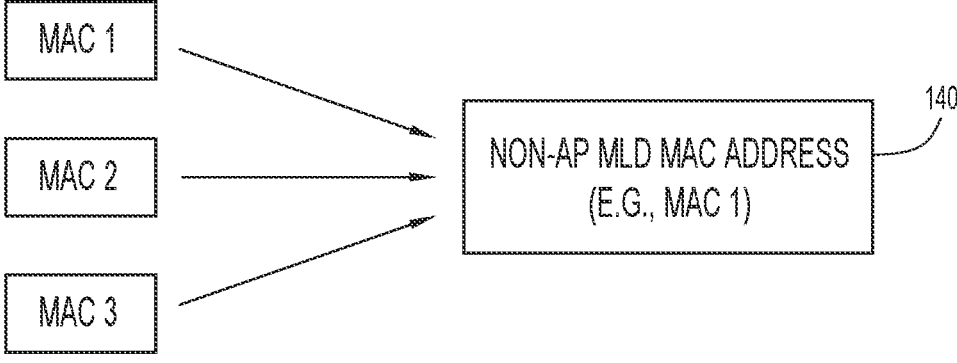
FIG. 2 depicts a mapping between respective unique MAC addresses of MLO links and a single non-AP (e.g., client) Multi-Link Device (MLD) MAC address, according to an example embodiment.

In this regard, and in accordance with one embodiment, AP 120 knows all its associated clients (mobile devices 110) and is in a good position to itself sniff association request/response frames of Overlapping BSS (OBSS) AP MLDs and OBSS AP beacons, so has a good knowledge of the mapping between MAC addresses of OBSS APs and clients. In an embodiment, frame sniffer 160 (and/or AP 120) sniffs and parses (Re)Association Request frames in order to construct a lookup table from MAC addresses used in over-the-air frames to a respective non-AP MLD MAC address 140. That is, as shown in FIG. 2, Address Mapping/Overwriting Logic 150 (operating in conjunction with frame sniffer 160) may be configured to generate a mapping between respective unique MAC addresses of MLO links and a single Multi-Link Device (MLD) MAC address. FIG. 2 shows mobile device MAC addresses MAC 1, MAC 2, MAC 3 being mapped to a single non-AP MLD MAC address 140 of the mobile device. Those skilled in the art will appreciate that a similar mapping may be performed for MAC address MAC 4, MAC 5, MAC 6 of AP 120 to AP MLD MAC address 145 (shown in FIG. 1).

Figure 3:
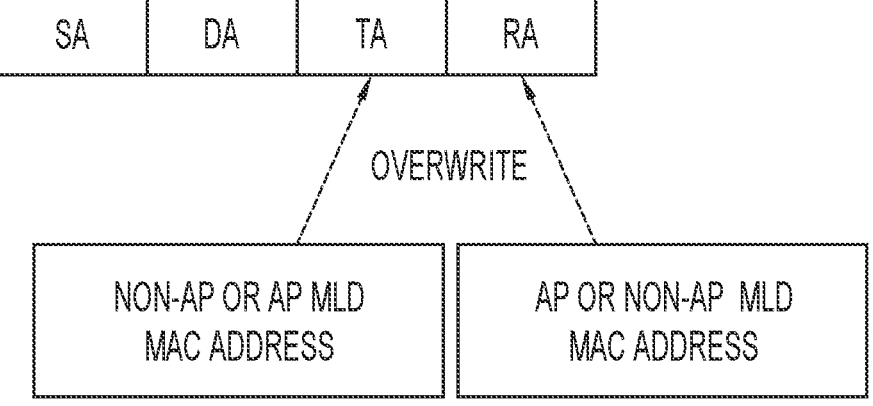
FIG. 3 illustrates how selected addresses in a frame may be overwritten with a MLD MAC address, according to an example embodiment.

In transmitted/sniffed frames later sent as a sniff record "over the wire," (e.g., to traffic analysis logic 180), Address Mapping/Overwriting Logic 150 may be configured to overwrite the address field in the frame identifying the client, namely SA/DA/TA/RA according to To/From Distributed System (DS), by the mobile device's 110 non-AP MLD MAC address 140. Here, SA is a source address, DA is a destination address, TA is a transmitting address, and RA is a receiving address. That is, as shown in FIG. 3, Mapping/Overwriting Logic 150 may overwrite at least one of the TA or RA address fields of a MAC header 400 with the appropriate MLD MAC address (which could be either the non-AP MLD MAC address 140, or the AP MLD MAC address 145, depending on which direction the traffic was flowing). More specifically, if both devices are MLDs, and traffic is uplink traffic, TA may be overwritten with non-AP MLD MAC address 140 and RA/BSSID with AP MLD MAC address 145. If traffic is downlink traffic, RA/DA may be overwritten with non-AP MLD MAC address 140 and TA/BSSID with AP MLD MAC address 145.

Figure 4:
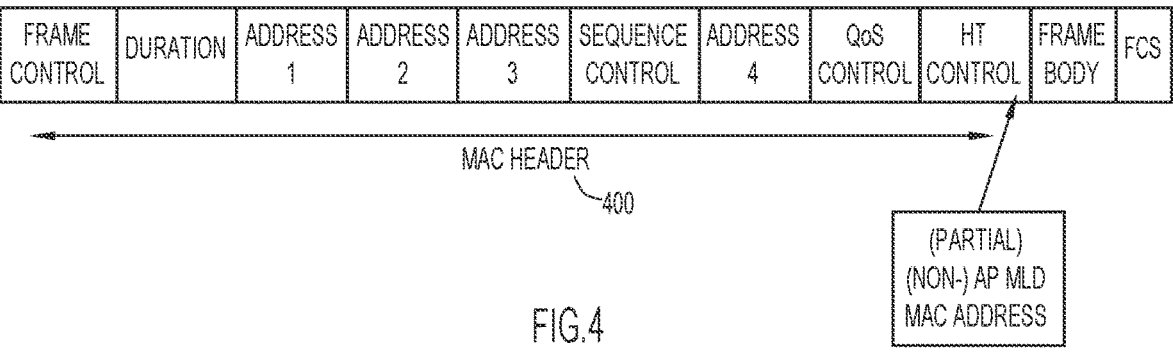
FIG. 4 shows a MAC header including a HT Control field in which a portion of the MLD MAC address may be written or saved, according to an example embodiment.

FIG. 4 shows MAC header 400 including fields in which the MLD MAC address of the MLD may be written, according to an example embodiment. More specifically, MAC header 400 includes several fields including a frame control field, a duration field, an Address 1 field, an Address 2 field, an Address 3 field, a sequence control field, a frame check sequence (FCS) field, and optionally, an Address 4 field, a Quality of Service (QoS) field, a HT control field, a frame body field. Depending on the scenario, the Address 1 field, Address 2 field, Address 3 field, and Address 4 field, may correspond, e.g., to SA/DA/TA/RA, or to RA/TA/DA/SA respectively. That is, in one embodiment, the (non-)AP MLD MAC address may overwrite one of the address fields in MAC header 400 for replicated/sniffed frames or packets.

In another embodiment, and as shown in FIG. 4, an MLD MAC address (or at least a portion thereof) may be saved into the HT control field of MAC header 400. More specifically, this embodiment may rely on a mobile device 110 using a similar MAC address for their non-AP MLD MAC address 140 as the affiliated STA's MAC address. If this is the case, then it may suffice to send a predetermined number (i.e., partial) bits of the mobile device's 110 non-AP MLD MAC address 140, even if not all bits.

As noted earlier, AP 120 knows all of its associated clients and sniffs and parses all (Re)Association Request frames in order to construct a lookup table from MAC addresses used in over-the-air frames to non-AP MLD MAC addresses, as illustrated in FIG. 2. In transmitted/sniffed frames later sent as a sniff record "over the wire" to, e.g., traffic analysis logic 180, Address Mapping/Overwriting Logic 150 may be configured to overwrite, e.g., a predetermined number of bits in the HT control field of MAC header 400 by a same number of least significant bits (LSBs) of the client's (mobile device's 110) non-AP MLD MAC address 140. In one possible implementation, with Control ID subfield of the A-Control field set to any of the reserved values (10-14), 26 bits may be reserved for encoding the non-OUI field of the MLD MAC address.

In another possible implementation, in a VHT variant, when Unsolicited MFB and MRQ bits are 0, the Reserved fields in the VHT variant HT Control field can be repurposed for encoding the non-OUI field of the MLD MAC address. The reserved fields are:

3 bits: MSI/STBC
3 bits: MFSI/GID-L
3 bits: GID-H
1 bit: Coding Type
1 bit: FB Tx Type
8 bits: BW, SNR in MFB (15 bits: MFB consists of 3 bits: NUM_STS to be set with a value of all 1s, 3 bits: VHT_MCS to be set with a value of all 1s (indicating no MCS Feedback), 2 bits: BW, 6 bits: SNR)

Thus, in all, 19 bits may be used.

In yet another implementation, in an HT Variant, Reserved bits in the Link Adaptation Control subfield include:

3 bits: MSI of MAI (when MRQ is 0)
3 bits: MFSI
7 bits: MFB

Reserved bits in the HT Control Middle subfield include
2 bits: Reserved (b20-b21)
4 bits: Reserved (b25-b28)

Thus, here too, 19 bits may be used.

In an embodiment, if an entire MAC address is later needed, it can be constructed with very high probability from the 32 or 19 MSBs of the client's address field (SA/DA/TA/RA according to To/From DS) in the MAC header 400 plus the stored 26 or 19 LSBs respectively.

In connection with embodiments in which MAC header 400 is modified in, e.g., an address or HT control field, it is optional to also recompute FCS and overwrite the FCS field, if present, in a reported captured frame.

Figure 5:
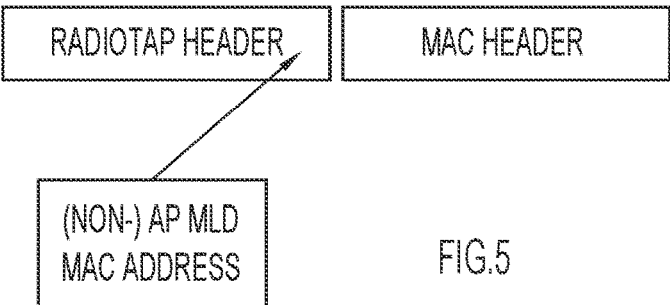
FIG. 5 illustrates how the MLD MAC address can be saved to a field of a Radiotap header before a (truncated) frame, according to an example embodiment.

In still another embodiment, FIG. 5 illustrates how a MLD MAC address can be saved to a (field of a) Radiotap header before a (truncated) frame. Once again, AP 120 knows all of its associated clients (mobile devices 110) and sniffs and parses all (Re)Association Request frames in order to construct a lookup table from MAC addresses used in over-the-air frames to, e.g., non-AP MLD MAC address 140, as shown in FIG. 2.

In transmitted/sniffed frames later sent as a sniff record "over the wire" to, e.g., traffic analysis logic 180, Address Mapping/Overwriting Logic 150 may be configured to insert, e.g., the non-AP MLD MAC address 140 into a Radiotap header for the sniffed frame. The particular location may either be vendor-specific defined or be a suggested and agreed Radiotap field. As those skilled in the art will appreciate, a Radiotap header may provide additional information to supplement the raw frame capture data that can be derived by analyzing the 802.11 frames. An added MLD MAC address can provide still more relevant information about frames.

Figure 6:
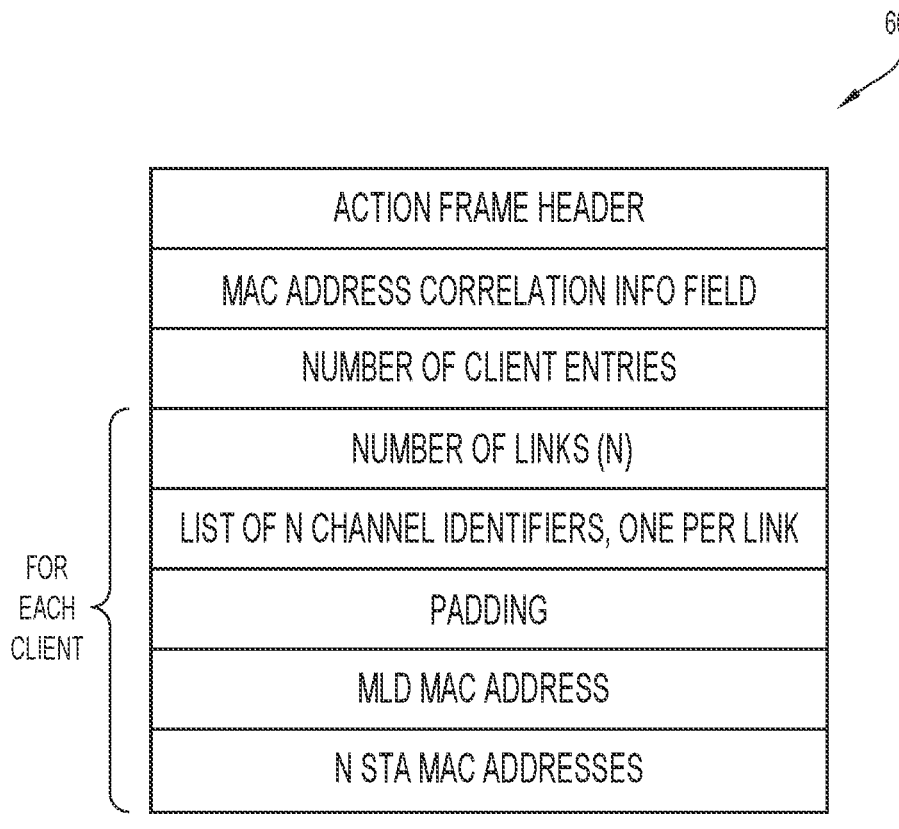
FIG. 6 is one possible configuration of a MAC Address Correlation Frame that may be transmitted periodically to broadcast a mapping between respective unique MAC addresses of MLO links and a MLD MAC address, according to an example embodiment.

In still another embodiment, FIG. 6 shows one possible configuration of a "MAC Address Correlation" frame" 600 that may be transmitted periodically to broadcast, on one or more or all links, the mapping between respective unique MAC addresses of MLO links and the single MLD MAC address of an MLD, according to an example embodiment.

More specifically, the "MAC Address Correlation" frame 600 may be configured to report the set of MAC addresses in use by a) a client (non-AP MLD, i.e., mobile device 110) or b) each client in a set of clients, as well as MAC addresses of AP 120, and potentially other nearby AP MLDs. With such a frame type available, Address Mapping/Overwriting Logic 150 may be configured to include non-AP MLD MAC address 140 of such client(s) and AP MLD MAC address 145, and potentially other nearby AP MLDs, in the frame. The MAC Address Correlation frame 600 may be configured as an action frame, and perhaps a vendor specific action frame, and could be sent to the broadcast address or a predetermined "debug" address.

As shown in FIG. 6, one possible format of the frame may be:

a) Action frame header, with, e.g., an identifying (Category, first octet of Action Details, etc.)-tuple b) MAC Address Correlation Info field: e.g., 8 bits (e.g., all reserved initially)

c) Number of client entries, e.g., 8 bits

Then for each client entry, e.g., d1) Number of links (N) reported in the client entry d2) List of N channel identifiers, one per link (e.g., Operating Class & Channel Number (2 B per link), and, optionally, Primary20's Operating Channel Number (for 3B in all). An example might include:

Channel 1, Frequency 2.412 GHz, 20 MHz Operating Class

Channel 36, Frequency 5.18 GHz, 40 MHz Operating Class

Channel 5, Frequency 5.975 GHz, 80 MHz Operating Class d3) Any intermingled padding to align with 16/32/48/64 bit boundaries d4) MLD MAC address (6 Bytes)

d5) N STA MAC addresses (N*6 Bytes) in the same order as the channel identifiers Once the MAC Address Correlation frame 600 is sent and saved at an appropriate location, traffic analysis logic 180 may be configured to enable the information from the MAC Address Correlation frame 600 to be applied to other frames of the client(s) or AP MLD(s) in the capture, both before the first corresponding MAC Address Correlation frame in the capture and until the next corresponding MAC Address Correlation frame 600 in the capture (or the end of the capture if there are no more).

In an embodiment, Address Mapping/Overwriting Logic 150 may be configured to include a configuration command for the infrastructure to enable/disable periodic transmission of the MAC Address Correlation frame 600 for AP MLD (s)/one client/a subset of clients (identified by a list, a MAC address mask, a property such as "all associated" or "carrying QoS traffic," etc.)/all clients. The configuration may further indicate if the frame is added by frame sniffer 160 and/or is transmitted wirelessly.

For each of the approaches described above, frame sniffer 160 sniffs and/or replicates frames and Address Mapping/Overwriting Logic 150 may be configured to merge the results across links, either during the sniffing or afterwards, and enable them to be saved to a single file (e.g., a pcapng file type).

Traffic analysis logic 180 can then load the sniffer file, and using the overwritten MAC address or overwritten HTC field, Radiotap header and/or MAC Address Correlation frame, correlate the frames transmitted by a client (mobile device 110) and an AP MLD using its various MAC addresses, and then present a single integrated view of all the communications between AP 120 and the client (mobile device 110).

FIG. 7 is a flowchart showing a series of operations that may be performed by Address Mapping/Overwriting Logic 150, according to an example embodiment. At 702 an operation may include receiving, at a wireless sniffing device, a first frame over a first link, the first link being associated with a first Media Access Control (MAC) address of a multi-link device (MLD). At 704, an operation may include receiving, at the wireless sniffing device, a second frame over a second link, the second link being associated with a second MAC address of the MLD. At 706, an operation may include generating a mapping between (a) the first MAC address and the second MAC address and (b) a MLD MAC address for the MLD. And, at 708, an operation may include supplying the MLD MAC address to a traffic analysis tool along with a copy of at least aspects of the first frame and a copy of at least aspects of the second frame.

Figure 8:
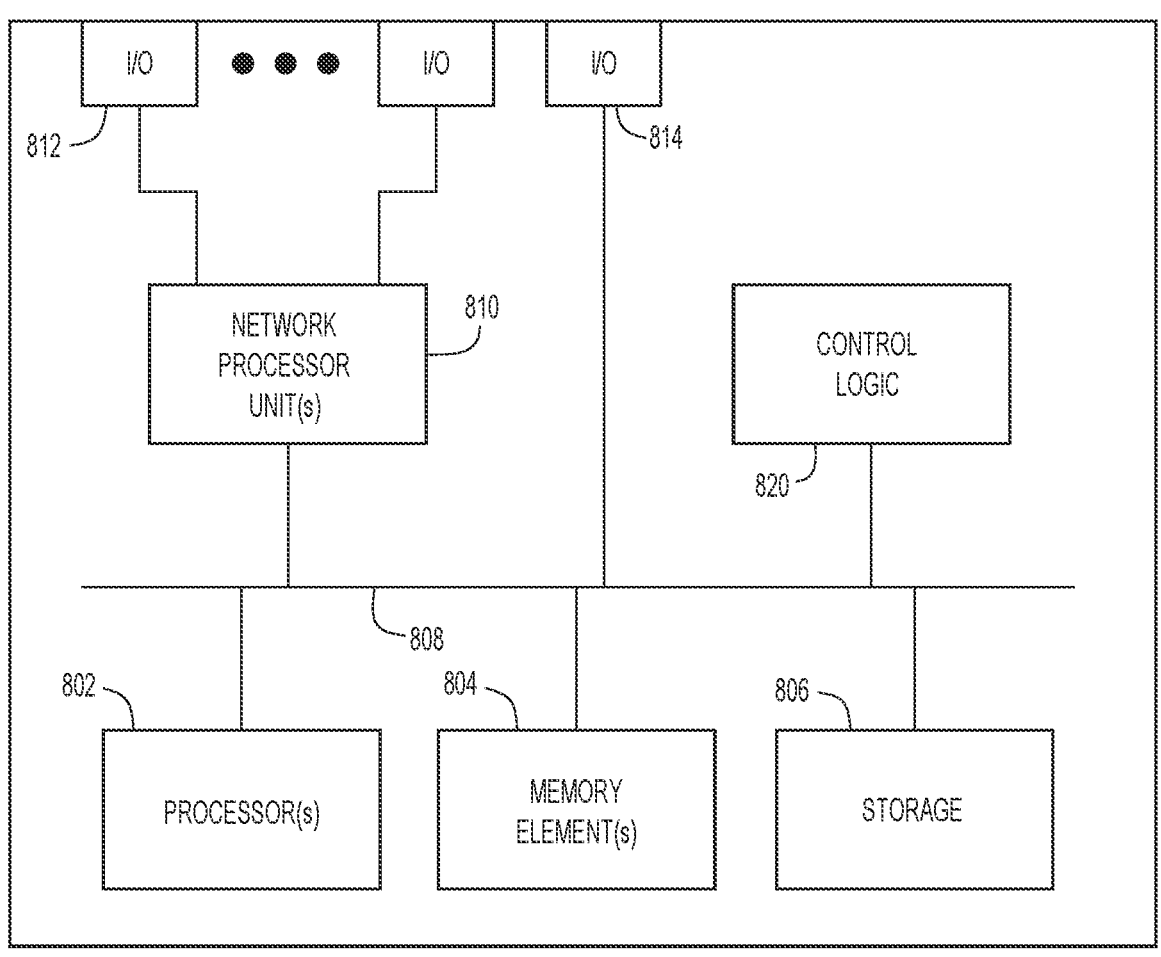
FIG. 8 is a block diagram of a computing device that may be configured to host Address Mapping/Overwriting logic, and perform the techniques described herein, according to an example embodiment.

FIG. 8 is a block diagram of a computing device (e.g., frame sniffer 160) that may be configured to execute Address Mapping/Overwriting Logic 150, and perform the techniques described herein, according to an example embodiment. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820 (which could include, for example, Address Mapping/Overwriting Logic 150. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element (s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa) or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/ antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may include receiving, at a wireless sniffing device, a first frame over a first link, the first link being associated with a first Media Access Control (MAC) address of a multi-link device (MLD), receiving, at the wireless sniffing device, a second frame over a second link, the second link being associated with a second MAC address of the MLD, generating a mapping between (a) the first MAC address and the second MAC address and (b) a MLD MAC address for the MLD, and supplying the MLD MAC address to a traffic analysis tool along with a copy of at least aspects of the first frame and a copy of at least aspects of the second frame.

In the method, the first frame and the second frame may be wirelessly communicated between an Access Point (AP) MLD and a non-AP MLD.

In the method, the first frame and the second frame may be wirelessly communicated between a first Access Point (AP) MLD and a second AP MLD, or between a first non-AP MLD and a second non-AP MLD.

The method may further include supplying the MLD MAC address to the traffic analysis tool as part of the copy of at least aspects of the first frame and as part of the copy of at least aspects of the second frame.

The method may further include overwriting an address field of the at least aspects of the first frame with the MLD MAC address.

The method may further include overwriting a field of a MAC header of the first frame with at least a portion of the MLD MAC address.

The method may further include overwriting the field of the MAC header of the first frame with a predetermined number of least significant bits of the MLD MAC address.

The method may further include supplying the MLD MAC address to the traffic analysis tool in respective radiotap headers for the copy of at least aspects of the first frame and the copy of at least aspects of the second frame.

The method may further include supplying the MLD MAC address to the traffic analysis tool by broadcasting the mapping.

The method may further include broadcasting the mapping in a dedicated MAC address correlation frame.

In another embodiment, a device may be provided and may include an interface configured to enable network communications, a memory, and one or more processors coupled to the interface and the memory, and configured to: receive a first frame over a first link, the first link being associated with a first Media Access Control (MAC) address of a multi-link device (MLD), receive a second frame over a second link, the second link being associated with a second MAC address of the MLD, generate a mapping between (a) the first MAC address and the second MAC address and (b) a MLD MAC address for the MLD, and supply the MLD MAC address to a traffic analysis tool along with a copy of at least aspects of the first frame and a copy of at least aspects of the second frame.

In the device, the first frame and the second frame may be wirelessly communicated between an Access Point (AP) MLD and a non-AP MLD.

In the device, the one or more processors may be further configured to: overwrite an address field of the at least aspects of the first frame with the MLD MAC address.

In the device, the one or more processors are further configured to: overwrite a field of a MAC header of the first frame with at least a portion of the MLD MAC address.

In the device, the one or more processors may be further configured to: overwrite the field of the MAC header of the first frame with a predetermined number of least significant bits of the MLD MAC address.

In the device, the one or more processors may be further configured to: supply the MLD MAC address to the traffic analysis tool in respective radiotap headers for the copy of at least aspects of the first frame and the copy of at least aspects of the second frame.

In yet another embodiment, one or more non-transitory computer readable storage media encoded with instructions are provided and that, when executed by a processor, cause the processor to: receive, at a wireless sniffing device, a first frame over a first link, the first link being associated with a first Media Access Control (MAC) address of a multi-link device (MLD), receive, at the wireless sniffing device, a second frame over a second link, the second link being associated with a second MAC address of the MLD, generate a mapping between (a) the first MAC address and the second MAC address and (b) a MLD MAC address for the MLD, and supply the MLD MAC address to a traffic analysis tool along with a copy of at least aspects of the first frame and a copy of at least aspects of the second frame.

The one or more non-transitory computer readable storage media may further include instructions that are configured to: supply the MLD MAC address to the traffic analysis tool as part of the copy of at least aspects of the first frame and as part of the copy of at least aspects of the second frame.

The one or more non-transitory computer readable storage media may further include instructions that are configured to: overwrite an address field of the at least aspects of the first frame with the MLD MAC address.

The one or more non-transitory computer readable storage media may further include instructions that configured to: supply the MLD MAC address to the traffic analysis tool in respective radiotap headers for the copy of at least aspects of the first frame and the copy of at least aspects of the second frame.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
   receiving, at a wireless sniffing device, a first frame over a first link, the first link being associated with a first Media Access Control (MAC) address of a multi-link device (MLD);
   receiving, at the wireless sniffing device, a second frame over a second link, the second link being associated with a second MAC address of the MLD;
   generating a mapping between (a) the first MAC address and the second MAC address and (b) a MLD MAC address for the MLD; and supplying the MLD MAC address to a traffic analysis tool along with a copy of at least aspects of the first frame and a copy of at least aspects of the second frame.

2. The method of claim 1, wherein the first frame and the second frame are wirelessly communicated between an Access Point (AP) MLD and a non-AP MLD.

3. The method of claim 1, wherein the first frame and second frame are wirelessly communicated between a first Access Point (AP) MLD and a second AP MLD, or between a first non-AP MLD and a second non-AP MLD.

4. The method of claim 1, further comprising supplying the MLD MAC address to the traffic analysis tool as part of the copy of at least aspects of the first frame and as part of the copy of at least aspects of the second frame.

5. The method of claim 4, further comprising overwriting an address field of the at least aspects of the first frame with the MLD MAC address.

6. The method of claim 4, further comprising overwriting a field of a MAC header of the first frame with at least a portion of the MLD MAC address.

7. The method of claim 6, further comprising overwriting the field of the MAC header of the first frame with a predetermined number of least significant bits of the MLD MAC address.

8. The method of claim 1, further comprising supplying the MLD MAC address to the traffic analysis tool in respective radiotap headers for the copy of at least aspects of the first frame and the copy of at least aspects of the second frame.

9. The method of claim 1, further comprising supplying the MLD MAC address to the traffic analysis tool by broadcasting the mapping.

10. The method of claim 9, further comprising broadcasting the mapping in a dedicated MAC address correlation frame.

11. A device comprising:
an interface configured to enable network communications;
a memory; and
one or more processors coupled to the interface and the memory, and configured to:
receive a first frame over a first link, the first link being associated with a first Media Access Control (MAC) address of a multi-link device (MLD);
receive a second frame over a second link, the second link being associated with a second MAC address of the MLD;
generate a mapping between (a) the first MAC address and the second MAC address and (b) a MLD MAC address for the MLD; and
supply the MLD MAC address to a traffic analysis tool along with a copy of at least aspects of the first frame and a copy of at least aspects of the second frame.

12. The device of claim 11, wherein the first frame and the second frame are wirelessly communicated between an Access Point (AP) MLD and a non-AP MLD.

13. The device of claim 11, wherein the one or more processors are further configured to:
overwrite an address field of the at least aspects of the first frame with the MLD MAC address.

14. The device of claim 11, wherein the one or more processors are further configured to:
overwrite a field of a MAC header of the first frame with at least a portion of the MLD MAC address.

15. The device of claim 14, wherein the one or more processors are further configured to:
overwrite the field of the MAC header of the first frame with a predetermined number of least significant bits of the MLD MAC address.

16. The device of claim 11, wherein the one or more processors are further configured to:
supply the MLD MAC address to the traffic analysis tool in respective radiotap headers for the copy of at least aspects of the first frame and the copy of at least aspects of the second frame.

17. One or more non-transitory computer readable storage media encoded with instructions that, when executed by a processor, cause the processor to:
receive, at a wireless sniffing device, a first frame over a first link, the first link being associated with a first Media Access Control (MAC) address of a multi-link device (MLD);
receive, at the wireless sniffing device, a second frame over a second link, the second link being associated with a second MAC address of the MLD;
generate a mapping between (a) the first MAC address and the second MAC address and (b) a MLD MAC address for the MLD; and
supply the MLD MAC address to a traffic analysis tool along with a copy of at least aspects of the first frame and a copy of at least aspects of the second frame.

18. The one or more non-transitory computer readable storage media of claim 17, wherein the first frame and the second frame are wirelessly communicated between an Access Point (AP) MLD and a non-AP MLD.

19. The one or more non-transitory computer readable storage media of claim 18, wherein the instructions are configured to:
overwrite an address field of the at least aspects of the first frame with the MLD MAC address.

20. The one or more non-transitory computer readable storage media of claim 17, wherein the instructions are configured to:
supply the MLD MAC address to the traffic analysis tool in respective radiotap headers for the copy of at least aspects of the first frame and the copy of at least aspects of the second frame.

* * * * *